(No Model.)
G. M. BEARD.
SWINGING FOLDING GATE.
No. 519,145.  Patented May 1, 1894.
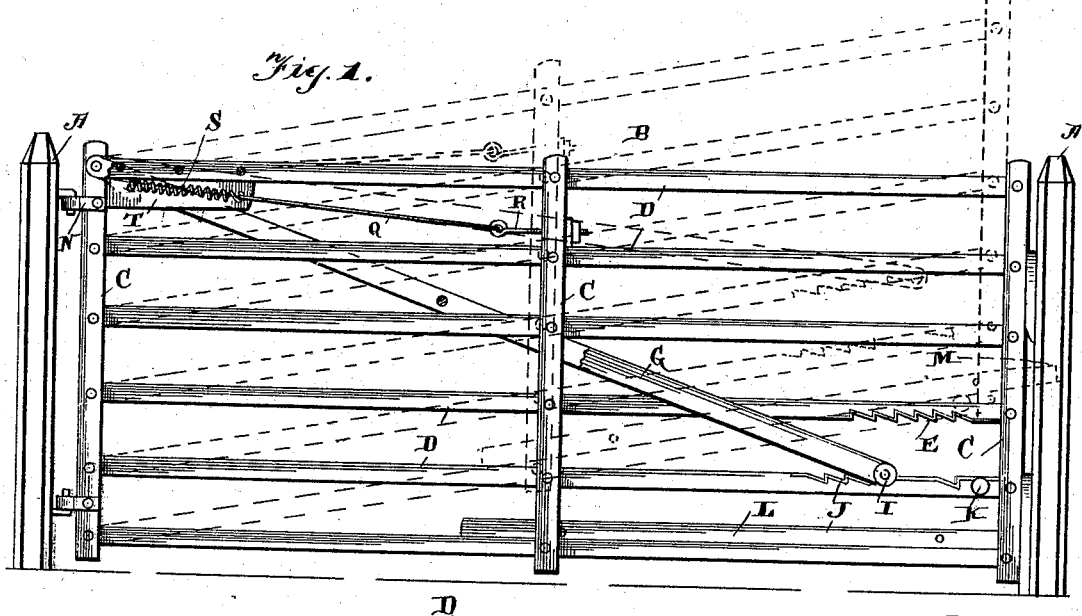
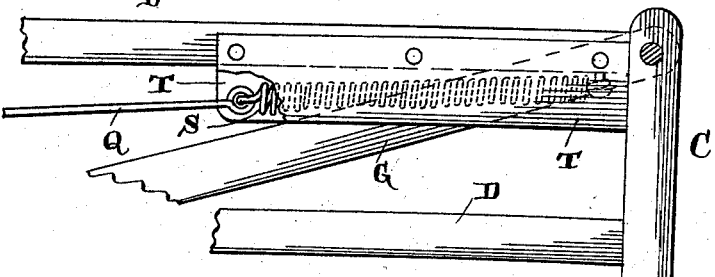
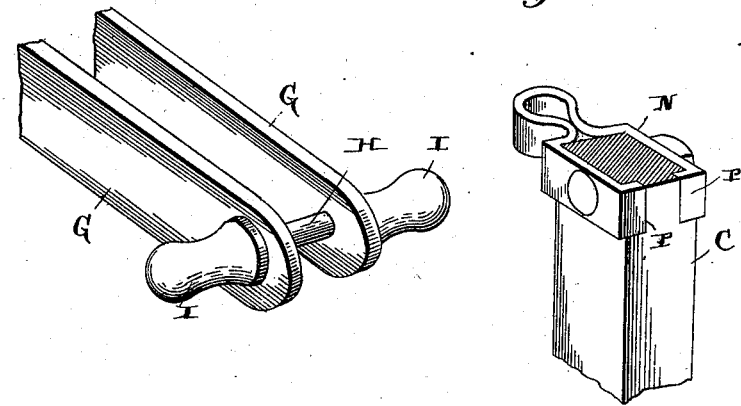
WITNESSES
Geo. E. Frech
Roland Fitzgerald
INVENTOR
G. M. Beard
per
Lehmann Pattison & Nesbit,
attys.
THE NATIONAL LITHOGRAPHING COMPANY,
WASHINGTON, D. C.

UNITED STATES PATENT OFFICE.

GEORGE M. BEARD, OF ANGOLA, INDIANA.

SWINGING FOLDING GATE.

SPECIFICATION forming part of Letters Patent No. 519,145, dated May 1, 1894.

Application filed September 2, 1893. Serial No. 484,611. (No model.)

*To all whom it may concern:*

Be it known that I, GEORGE M. BEARD, of Angola, in the county of Steuben and State of Indiana, have invented certain new and useful Improvements in Swinging Folding Gates; and I do hereby declare the following to be a full, clear, and exact description of the invention, such as will enable others skilled in the art to which it pertains to make and use it, reference being had to the accompanying drawings, which form part of this specification.

My invention relates to an improvement in swinging folding gates, and it consists of a gate having the construction hereinafter fully shown and described and which will be fully pointed out in the claims.

The object of my invention is to provide a swinging folding gate, which is capable of being raised and automatically locked in the raised position at any desired height for the purposes hereinafter specified, and which is automatically locked in its lowered position by the same means which hold it in its elevated position.

Referring to the accompanying drawings: Figure 1, is a side elevation of a gate which embodies my invention. Fig. 2, is a detached perspective view of the free end of the supporting brace. Fig. 3, is a detached perspective view of the hinge. Fig. 4, is a view of the upper hinged end of the gate, showing the plates at each side of the spring.

A indicates the gate posts which are set in the ground in the usual manner, and B a gate composed of the end and central vertical bars C, connected by the horizontal rails D through the medium of pivotal pins which pass through the said bars. Owing to the fact that the vertical and horizontal parts of the gate are pivotally connected instead of being held rigid by nails, the same is capable of being elevated as shown in dotted lines in Fig. 1. One of the horizontal rails, preferably the third one from the bottom of the gate is provided near its outer end with a serrated plate E at its lower edge. A brace G formed of two parallel bars, as shown in Fig. 2, has its upper end pivotally connected to the upper hinged end of the gate by means of the pivotal pin which connects the adjacent ends of the vertical and horizontal parts. The opposite ends of these parallel braces are united by means of a cross bar H, which forms a handle for operating the said braces, by having its ends I extended beyond the side of the said parallel bars of the brace. The horizontal rail just below the serrated plate is provided with a plate J, notched on its upper edge and the said rail correspondingly notched.

It will be noticed that the two plates are one above the other, and that when the free end of the brace is raised by taking hold of one of the extended ends of the transverse bar H, the said transverse bar engages the notches in the under side of the rail above, so that as the gate is raised the lock for holding it in its raised position is made automatically by the engagement of the said bar with the notched plate. So also, when the gate is to be lowered from a raised position, the handle or knob K, is taken hold of and the gate slightly raised when the free end of the brace will fall upon the upper edge of the rail below, and then as the gate is lowered to its normal position the cross bar at the free end of the brace drops into the notches formed in the rail below and the plate attached thereto, whereby the gate is locked automatically so that it can not be raised by the stock, for the reason that the free end of the brace must first be raised to displace the transverse bar from the notches in the upper edge of the rail upon which it rests.

Between the two lower horizontal parts is an endwise sliding bar L, which has its outer end adapted to enter mortise M, shown in dotted lines in the gate post, so that when the free end of the gate is raised and it is desired to hold it in this position the outer end of the said bar is placed within this mortise. In this position small stock is permitted to pass under the gate, while large stock is prevented from passing through, as will be readily understood. When the gate is swung open and it is desired to leave it in this position any length of time, the free end of the brace is detached from the notched plate above, which allows the gate to rest upon the ground and thus prevents it from being blown by the wind, as would otherwise be the case.

The hinges for the gate consist of plates N which extend around the vertical bars of the gate as shown, and are held in place by a single transverse bolt, thus making a very simple but rigid hinge. The inwardly bent ends P of these hinges rest in mortises or notches cut in the inner edges of the said vertical bars as shown.

From the above description it will be seen that I have produced a very simple and cheap farm gate which is capable of being raised and locked in the raised position automatically for the purpose of swinging over snow drifts or permitting small stock to pass under it, and which is also locked in its lowered position, so that the same cannot be opened by stock.

In order to make the gate easier to lift at its free end I provide a spring S which is connected to the upper rear end of the gate, and its opposite end connected with a rod Q, which is in turn connected with an adjustable screw threaded bolt R, which latter is connected with the central vertical standard C, of the gate. The tendency of this spring is to raise the front end of the gate, and by means of the screw threaded rod R, and the nut thereon the tension of the spring can be regulated and the weight of the free end of the gate thus also regulated, for the purpose of enabling it to be raised with but little effort, as will be readily understood. Depending pieces T at each side of the spring S, protect it from damage as is clearly shown.

Having thus described my invention, what I claim as new, and desire to secure by Letters Patent, is—

1. A gate consisting of pivoted vertical and horizontal bars and rails, and a brace having one end pivotally connected to the upper end of the gate, its lower end provided with a transverse bar passing between two of the horizontal rails, the adjacent edges of the two rails between which said transverse bar passes being notched, substantially as shown and described.

2. A gate comprising vertical and horizontal pivoted bars and rails, a brace having one end pivoted to the upper hinged end of the gate and its opposite end provided with a transversely extending rod which passes through between two of the horizontal rails, the upper and lower edges respectively of the rails between which the bar passes provided with notches which respectively extend in opposite directions, whereby when the brace is raised the gate is held in an elevated position and when the brace is dropped the gate is locked in its normal position, substantially as specified.

In testimony whereof I affix my signature in presence of two witnesses.

GEORGE M. BEARD.

Witnesses:
CYRUS CLINE,
NEWTON W. GILBERT.